United States Patent [19]
Kamio

[11] 3,946,845
[45] Mar. 30, 1976

[54] CLUTCH RELEASE CLEARANCE ADJUSTER

[75] Inventor: Takenori Kamio, Neyagawa, Japan

[73] Assignee: Kabushiki Kaisha Daikin Seisakusho, Osaka, Japan

[22] Filed: Dec. 31, 1974

[21] Appl. No.: 537,708

[52] U.S. Cl. ........................... 192/111 A; 192/30 W
[51] Int. Cl.² ......................................... F16D 13/75
[58] Field of Search ........... 192/111 A, 70.25, 30 W

[56] References Cited
UNITED STATES PATENTS

| | | | |
|---|---|---|---|
| 2,421,869 | 6/1947 | Brock | 192/111 A |
| 2,885,049 | 5/1959 | Staadt | 192/111 A |
| 3,430,744 | 3/1969 | Oguri | 192/111 A |
| 3,430,745 | 3/1969 | Randol | 192/111 A |

Primary Examiner—Benjamin W. Wyche
Attorney, Agent, or Firm—Pierce, Scheffler & Parker

[57] ABSTRACT

For ensuring a safer and more satisfactory operation of a clutch system, clutch release clearance may be maintained constant by the integration into the system of a clearance adjuster. This adjuster may provide a warning when the clutch facing has undergone excessive wear.

3 Claims, 3 Drawing Figures

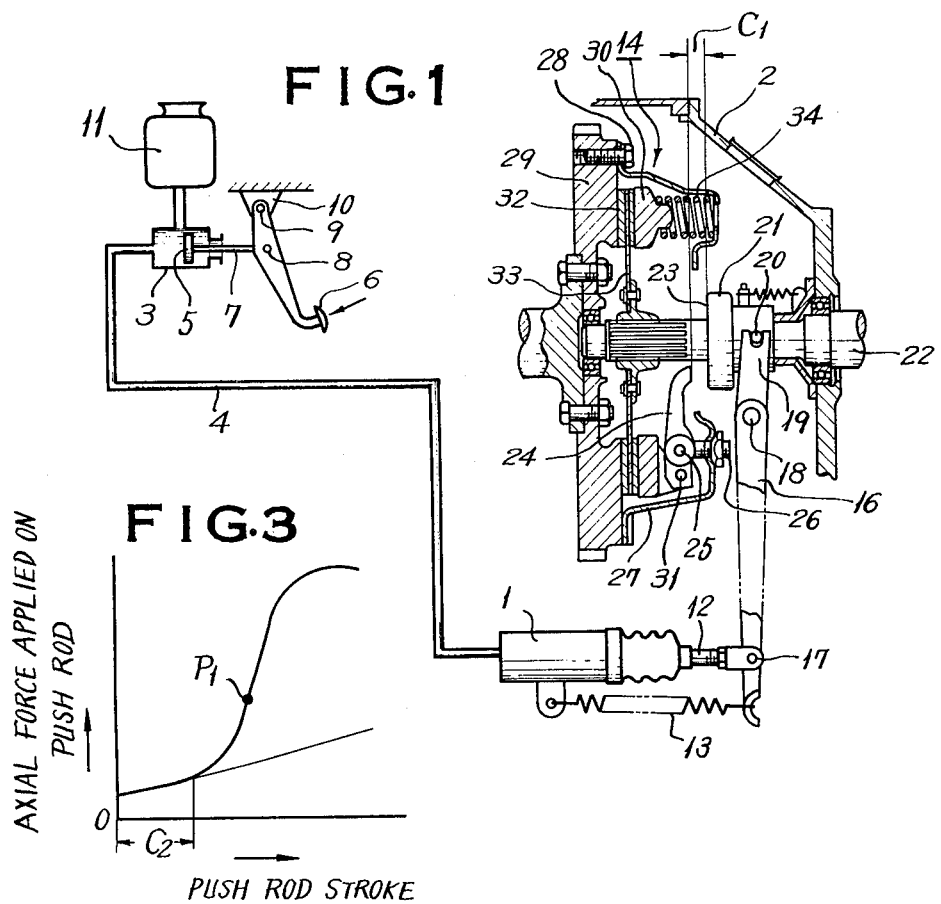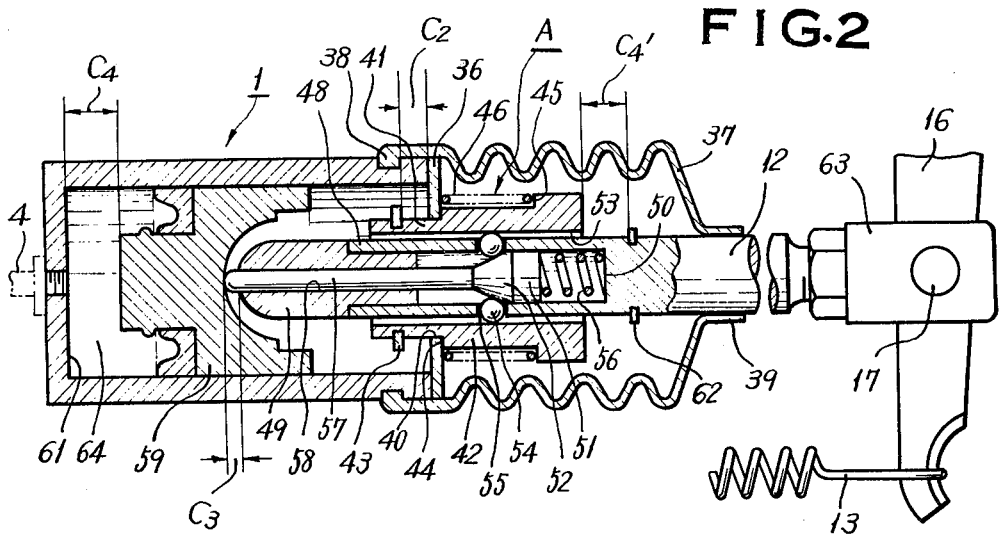

CLUTCH RELEASE CLEARANCE ADJUSTER

This invention relates to a device to keep clutch release clearance constant.

In conventional oil clutch systems for automobiles and industrial vehicles such as lift trucks, clutch release clearance adjusters heretofore have not been installed. Therefore, as abrasion of the clutch facing material increases, clutch pedal idle stroke increases relatively. Drivers have to be more careful during operation, since the clutch is not sharply released according to the long idle stroke.

This invention avoids the above discussed problems and the principal object of the invention is to provide a novel clutch release clearance adjuster which can be easily attached changeably to most of the oil clutch systems now in use or on the market.

Another object of the invention is to provide a clutch release clearance adjuster which operates accurately over a very long time.

A third inventive object is to provide a clutch release clearance adjuster which can notify an operator of the abrasion or wear-in amount of the clutch facing, and can even alarm signifying that the life or duration term of the facing is about over.

These and other objects and advantages will be apparent from the following detailed description, when read in conjunction with the accompanying drawings, wherein:

FIG. 1 is a schematic view of an oil clutch system embodying this invention;

FIG. 2 is an elevational sectional view of a slave (or release) cylinder shown in FIG. 1; and FIG. 3 is a diagram showing relation between axial force applied on a push rod and the stroke of the push rod.

Referring now to FIG. 1 of the drawing, the device to keep clutch release clearance at a constant value is installed in a slave cylinder 1 which is attached outside a clutch housing 2 by means of a bracket (not shown), and is connected to a master cylinder 3 through a high-pressure pipe 4. Slidably inserted inside the cylinder 3 is a piston 5 which is connected to a clutch pedal 6 by way of a rod 7 and pin 8.

Pedal 6 is pivoted on a pin 9 supported on a stationary bracket 10. Numeral 11 illustrates a filler tank for working fluid. When a clutch release force is applied, by the operator, on the pedal 6; fluid inside the cylinder 3 is compressed by piston 5, and this pressure is transmitted to slave cylinder 1 whereby to push out a push rod 12 to the right in FIG. 1, extending a return spring 13 to release a clutch 14.

Pushrod 12 is connected to a release yoke lever 16 by a pin 17. The yoke lever 16 is fixed and on axle 18 which is provided with yoke 19 inside the housing 2.

Yoke 19 engages on a pin 20 projecting on the side wall of a thrust bearing 21 which is slidably journalled on a top shaft 22. Bearing surface 23 faces toward the radially inner ends of three release levers 24 a clutch release clearance $C_1$ between said face and said levers. When the clutch 14 is engaged, each release lever 24 is pivoted on a pin 25 of an adjustment stud 26 which is supported on a clutch cover 27. The cover 27 is fixed, by an array of bolts 28, to an engine flywheel 29.

At the radially outward ends of release levers 24, a pressure plate 30 is connected by pins 31, and the plate 30 is pressed to a clutch facing 32 of clutch disc 33 by clutch springs 34 to engage the disc 33 with fly wheel 29. The disc 33 is slidably supported on top shaft 22 through splines as shown.

When push rod 12 projects to the right, the release yoke lever 16 declines anti-clockwise around axle 18 and, in turn, thrust bearing 21 slides to the left for the idle stroke equal to clearance $C_1$, then contacts and starts to apply release force on the inner ends of release lever 24. Upon rotation of release levers 24 around pin 25, pressure plate 30 is pulled by pins 31 to the right leaving the driven clutch disc 33 released from the engine fly wheel 29.

In the prior art oil clutch systems, clutch release clearance $C_1$ decreases gradually as abrasion of the facing (32) increases. This causes an undesirable change in the clutch pedal position where the clutch is released. After the release levers 24 touch the bearing surface 23, abrasive sliding or slip of clutch facing 32 as well as abrasion between release levers 24 and bearing surface 23 occurs.

The present invention avoids the above disadvantages. FIG. 2 illustrates the inside of the slave cylinder 1 including a device A according to the present invention when the clutch is in engaged state as shown in FIG. 1 holding a predetermined release clearance $C_1$. In FIG. 2, an annular holder plate 36 abuts an opening end surface of slave cylinder 1 and is held in position by a rubber boot 37 which engages at its leftmost inner flange 38 in an annular groove formed on the cylinder 1, and its rightmost cylindrical portion 39 fits on the push rod 12. The holder plate 36 functions as an important member to give the device "A" interchangeability. Slidably journalled in a round hole 40 is a cylindrical smaller diameter portion 41 of a sleeve 42 the stroke or clearance $C_2$ of which is defined by a snap ring 43 engaged in an annular groove on the sleeve. The clearance $C_2$ relates to the release clearance $C_1$ (FIG. 1) in the manner that, during movement of sleeve 42 to the right as far as snap ring 43 abuts to holder plate 36, thrust bearing 21 (FIG. 1) is forced to the left as far as $C_1$. The sleeve 42 abuts the holder plate 36 at its annular stepped portion 44 under the influence of return spring 13, as explained later. Between the plate 36 and another stepped portion 45, a compression coil spring 46 is installed, the strength of which spring 46 being weaker than that return spring 13.

Slidably journalled inside the sleeve 42 is a pipe portion 48 which is formed at left half part of push rod 12 in one piece and is plugged by a head 49 forming a cylindrical chamber 50 inside the pushrod 12 where a lock piece 51 with a tapered portion 52 is inserted. Between the tapered portion 52 and longitudinal groove 53 with semi-circular cross section, two steel balls 54 are wedged with their axial movement restricted by respctive holes 55 each of which opens on pipe portion 48 just snugly facing to the respective groove 53.

The lock is effected by a compression spring 56 which is stronger than return spring 13. The lock piece 51 is provided with a subsidiary one-piece push rod 57 which fits in a central hole 58 of the head 49 and projects a distance $C_3$ from the leftmost end of the head 49 to contact with a piston 59 slidably lifting in the slave cylinder 1.

Between the piston 59 and end wall 61 there is formed a clearance $C_4$ which is equal to a clearance $C_4'$ formed between sleeve 42 and snap ring 62.

Push rod 12 is adjustably connected to a coupling 63.

During operation, when a driver wants to release the clutch and pressurized fluid is supplied to a fluid chamber 64 (FIG. 2), piston 59 moves to the right together with push rod 12 against the tension of stretching return spring 13, with push rod 57 remaining in projecting position to the left, as is shown in FIG. 2. So positioned, it maintains the locked state between three members, i.e. sleeve 42 and push rods 12, 57 in that the spring 56 is stronger than return spring 13 whilst spring 46 is much weaker than is spring 13. The locked state terminates when snap ring 43 comes into abutting engagement with holder plate 36 to stop the sleeve 42. At the same time, thrust bearing 21 (FIG. 1) comes into press contact with release lever 24 after shifting to the left as far as release clearance $C_1$, thereby transmitting reaction force to the push rod 12. Then, subsidiary push rod 57 shifts to the right in the hole 58, against compression spring 56, leaving two balls 54 in freed condition until piston 59 and push rod head 49 directly abut each other. After that, piston 59 and push rod 12 move to the right in unison, thus rotating yoke lever 16 anti-clockwise (FIG. 1) around axle 18. Thrust bearing 21 continues to shift to the left, pressure plate 30 recedes from clutch facing 32 and clutch disc 33 is set free from engine fly wheel 29.

When clutch engagement is required, as the driver's force applied on clutch pedal 6 (FIG. 1) decreases, thrust bearing 21 recedes to the right mainly under the influence of clutch spring 34, the effective force of which is greater than is the effective force of compression spring 56, with the clutch facing 32 gradually pressed to the fly wheel 29 by pressure plate 30 to effect a complete engagement. As soon as complete engagement is achieved, and contact relation between thrust bearing 21 and release lever 24 is broken, strong spring 56 (FIG. 2) extends and tapered portion 52 engages balls 54 in wedge-like manner to completely prevent relative axial movement between sleeve 42 and push rod 12. Then sleeve 42 and push rod 12 move to the left by return spring 13 as though they are in one piece, as far as stepped portion 44 abuts holder plate 36. Thus the adequate release clearance $C_1$, which is determined by clearance $C_2$, is provided as shown in FIGS. 1 and 2.

FIG. 3 illustrates the above operation in view of axial force applied to push rod 12. At point $P_1$, ball 54 (FIG. 2) is locked when the axial force is decreasing, or is unlocked when the force is increasing.

As the abrasion of clutch facing 32 (FIG. 1) increases, the axial contact position of thrust bearing 21 with respect to release lever 24 recedes to the right. Also, locked position of push rod 12 moves to the left (FIG. 2). But predetermined release clearance $C_1$ is always kept constant as long as clearance $C_4$ (FIG. 2) is maintained. When face abrasion reaches its allowable amount, piston 59 comes into abutting contact with the bottom wall 61. After that, constant release clearance $C_1$ is not maintained. Since clearance $C_4'$ is set as equal to clearance $C_4$, operator can inspect the degree of face abrasion only by peeling end portion 39 of rubber boot 37. A limit switch (not shown) may be attached in place of snap ring 62 to automatically alarm that the face wear reaches up to its allowable extent. For that purpose, the limit switch, an alarm means such as warning lamp or buzzer, and a battery are connected to form a series circuit, and the limit switch is adapted to close the circuit when its contact piece comes in contact with sleeve 42.

According to the present invention, the adjusting device A, which is mainly composed of sleeve 42, push rod 12 and locking means such as balls 54, can be interchengeably applied to various kinds of slave cylinders simply by changing the size of holder plate 36. Since the device A is held by boot 37 in position, it is easy to separate the device from slave cylinder 1 in case of inspection. This also ensures easy assembling. Since in the clearance $C_2$, there is nothing installed (such as a cone spring) to keep the clearance open, accurate release clearance $C_1$ is always given and thus a stable performance is maintained.

I claim:

1. In a clutch system including a clutch master cylinder (3), a clutch release clearance adjusting mechanism which comprises a slave cylinder (1) having an open end, and being connected to said clutch master cylinder (3);

a piston (59) slidably inserted in slave cylinder (1);

a release yoke lever (16);

a push rod (12) connecting said piston (59) with said release yoke lever (16);

a sleeve (42) coaxial with push rod (12);

an annular holder plate (36) abutting the open end of slave cylinder (1) and being held inside a boot (37) attached between slave cylinder (1) and push rod (12) and being connected to push rod (12) by way of an adjuster assembly which permits push rod (12) to recede only as far as a predetermined clearance $C_2$, so as to give a predetermined release clearance $C_1$ soon after the clutch is fully released, said adjuster assembly consisting essentially of locking means in cooperation with said push rod (12) and said sleeve (42), said holder plate (36) being provided with an inner hole (40) in which aforesaid sleeve (42) is slidably journalled as far as clearance $C_2$ corresponding to release clearance $C_1$, said sleeve (42) being loaded to project outwardly from cylinder (1) by a spring (46) which is weaker than a return spring (13), push rod (12) being slidably inserted in sleeve (42), and a lock device being installed between sleeve (42) and push rod (12) which device is released only when thrust bearing (21) is pressed against release levers (24), and said push rod (12) being provided with a pipe portion (48) where a head (49) with axial hole (58) is fixed, a lock piece (51) with a tapered portion (52) is inserted in the pipe portion (48), a subsidiary push rod (57) integral with lock piece (51) slidably fits inside hole (58), a compression spring (56) the effective force of which is weaker than the effective force of spring (34) but which is stronger than is return spring (13) being disposed between lock piece (51) and the bottom of pipe portion (48), steel balls (54) are disposed in respective holes (55) facing sleeve (42) and tapered portion (52), and push rod (57) projects from head (49) as far as $C_3$ against piston (59) when steel balls (54) lock sleeve (42) and push rod (12).

2. A clutch release clearance adjusting mechanism as defined in claim 1, wherein each ball (54) engages in a groove (53) axially extending inside surface of sleeve 42.

3. A clutch release clearance adjusting mechanism as defined in claim 1, wherein push rod (12) is provided with a snap ring (62), and the distance $C_4'$ between snap ring (62) and sleeve (42) is determined equal to distance $C_4$ between piston (59) and bottom (61) of cylinder (1).

* * * * *